(12) United States Patent  (10) Patent No.: US 7,694,996 B2
Saville et al.  (45) Date of Patent: Apr. 13, 2010

(54) FOLDABLE AND HEIGHT-ADJUSTABLE STROLLER

(75) Inventors: Derek Saville, Stockton, CA (US);
Daniel N. Newhard, Lititz, PA (US);
Nico Michler, Leinfelden (DE);
Christian Busse, Munich (DE); Bianca Fleischer, Santa Monica, CA (US)

(73) Assignee: Graco Children's Products Inc., Atlanta, GA (US)

( * ) Notice: Subject to any disclaimer, the term of this patent is extended or adjusted under 35 U.S.C. 154(b) by 365 days.

(21) Appl. No.: 11/747,086

(22) Filed: May 10, 2007

(65) Prior Publication Data

US 2007/0296182 A1 Dec. 27, 2007

Related U.S. Application Data

(60) Provisional application No. 60/799,177, filed on May 10, 2006.

(51) Int. Cl.
*B62B 3/02* (2006.01)
(52) U.S. Cl. ............... 280/642; 280/647; 280/47.38
(58) Field of Classification Search ........... 280/642, 280/643, 647, 648, 649, 650, 47.38, 47.41
See application file for complete search history.

(56) References Cited

U.S. PATENT DOCUMENTS

| | | | |
|---|---|---|---|
| 4,265,466 A | 5/1981 | Kassai | |
| 5,301,970 A | 4/1994 | Haskins | |
| 5,601,302 A | 2/1997 | Beard et al. | |
| 5,709,400 A | 1/1998 | Bonnier et al. | |
| 6,099,022 A | 8/2000 | Pring | |
| 6,193,263 B1 | 2/2001 | Lin | |
| 6,203,054 B1 | 3/2001 | Matsumoto | |
| 6,209,892 B1 | 4/2001 | Schaaf et al. | |
| 6,398,233 B1 | 6/2002 | Liang et al. | |
| 6,446,990 B1 | 9/2002 | Nania et al. | |
| 6,513,827 B1 * | 2/2003 | Barenbrug | 280/648 |
| 6,540,250 B1 | 4/2003 | Peterson | |
| 6,715,783 B1 | 4/2004 | Hanson et al. | |
| 6,976,699 B2 * | 12/2005 | Koerlin | 280/650 |
| 7,032,922 B1 * | 4/2006 | Lan | 280/648 |

(Continued)

FOREIGN PATENT DOCUMENTS

DE  2 648 102  12/1990

(Continued)

OTHER PUBLICATIONS

Britax Preview Lightweight Umbrella Travel System (Jun. 2004).

(Continued)

*Primary Examiner*—Hau V Phan
*Assistant Examiner*—John D Walters
(74) *Attorney, Agent, or Firm*—Lempia Braidwood LLC

(57) ABSTRACT

A stroller is provided having a stroller frame supporting a stroller seat. The stroller frame includes a linkage that facilitates collapsing or folding of the stroller frame from an in-use configuration to a folded or collapsed configuration, and unfolding of the stroller frame from the folded or collapsed configuration to the in-use configuration. The linkage also facilitates adjustment of the stroller seat height between at least two vertically offset positions.

21 Claims, 6 Drawing Sheets

U.S. PATENT DOCUMENTS

| | | |
|---|---|---|
| 7,377,537 B2 * | 5/2008 | Li .............................. 280/650 |
| 7,527,283 B2 * | 5/2009 | Horacek .................... 280/642 |
| 2002/0084628 A1 | 7/2002 | Van Horn |
| 2006/0001226 A1 | 1/2006 | Refsum |
| 2007/0045975 A1 | 3/2007 | Yang |
| 2008/0284137 A1 * | 11/2008 | Popp ......................... 280/647 |

FOREIGN PATENT DOCUMENTS

| | | |
|---|---|---|
| DE | 203 13 208 | 10/2003 |
| EP | 0 522 783 | 1/1993 |
| EP | 1 693 277 | 8/2006 |
| FR | 2 458 443 | 1/1981 |
| WO | WO 96/22907 | 8/1996 |
| WO | WO 00/06437 | 2/2000 |

OTHER PUBLICATIONS

International Preliminary Report on Patentability issued in related International application No. PCT/US2007/068696 mailed Jun. 16, 2008.

Stokke Product Guide featuring Stokke Xplory stroller, 7 pages, (Fall 2006).

International Search Report and Written Opinion issued in related International application No. PCT/US2007/068696 mailed Oct. 31, 2007.

* cited by examiner

FOLDABLE AND HEIGHT-ADJUSTABLE STROLLER

RELATED APPLICATION DATA

This patent is related to and claims priority benefit of U.S. Provisional Patent Application No. 60/799,177, which was filed on May 10, 2006 and entitled "Stroller with Height-Adjust and Folding Capability," and which is hereby incorporated by reference in its entirety.

BACKGROUND OF THE INVENTION

1. Field of the Disclosure

The present disclosure is generally directed to strollers, and more particularly to a stroller with a frame structure that permits seat height adjustment and can be moved between an in-use configuration and a collapsed or folded configuration.

2. Description of Related Art

Well-designed strollers should be sturdy and balanced, and should provide the child passenger with safe and comfortable transport. Throughout the development of strollers, an effort has been made to include features that render the stroller versatile and convenient. Efforts have been made to provide these features while achieving a simple design, yet maintaining the stroller rugged and reliable.

A conventional stroller has a plurality of wheels supporting a stroller frame that supports one or more stroller seats. Some conventional stroller frames can be moved between an in-use position and a collapsed or folded configuration for easy, space-minimizing storage. Some conventional stroller seats can be articulated to a horizontal position so that an infant can lie in a prone position while riding in the stroller. Unfortunately, the seats have a fixed height, and define a distance to the caregiver that requires the caregiver to bend substantially to reach the infant, if needed.

What is therefore needed is a stroller having a seat supported by the stroller frame that is height-adjustable and capable of articulating between a vertical and a horizontal orientation. It would further be desirable that such a stroller be configured to move between a folded, or collapsed, storage configuration and an unfolded, or open, in-use configuration.

SUMMARY

In accordance with one aspect of the present invention, a stroller is provided that is foldable between an open configuration and a folded configuration. The stroller includes a stroller frame having a plurality of stroller frame components. The stroller frame is movably supported by at least one wheel. A seat assembly is supported by the stroller frame. The seat assembly includes a seat that can be moved between a first height and a second height different than the first height. A linkage has a first end connected to the stroller frame and a second end connected to the seat assembly. The linkage joins a first and second stroller frame component such that movement of the first stroller frame component between its folded and an unfolded configuration causes the second stroller frame component to correspondingly move between its folded and unfolded configuration.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the fill scope of the invention.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A stroller and frame construction is disclosed and provides a stroller with both a seat height-adjust feature and a frame folding or collapsing feature. In one example, the frame structure includes an adjustment assembly that facilitates both folding and unfolding of the stroller frame between an in-use configuration and a storage configuration, and farther facilitates height adjustment of the stroller seat in order to bring the infant or child closer to the care giver when desired by the care giver. In one aspect, the adjustment assembly includes a four-bar linkage arrangement that is employed as part of the frame structure, and achieves both the seat height adjust and the frame folding functions.

Figure 1:
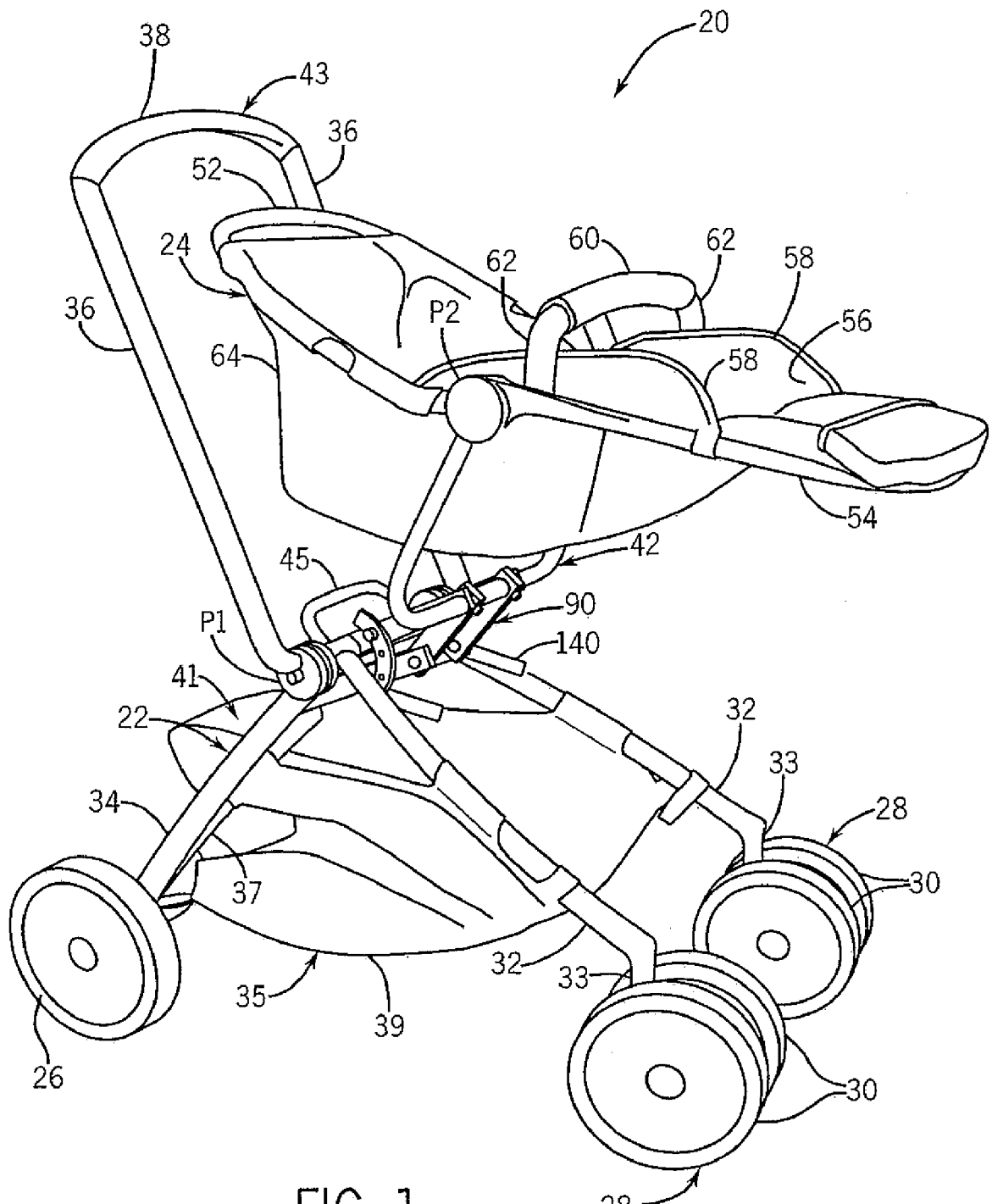
FIG. 1 is a perspective view of a stroller including a stroller frame assembly having an adjustment assembly constructed in accordance with certain aspects of the present invention.
Figure 2:
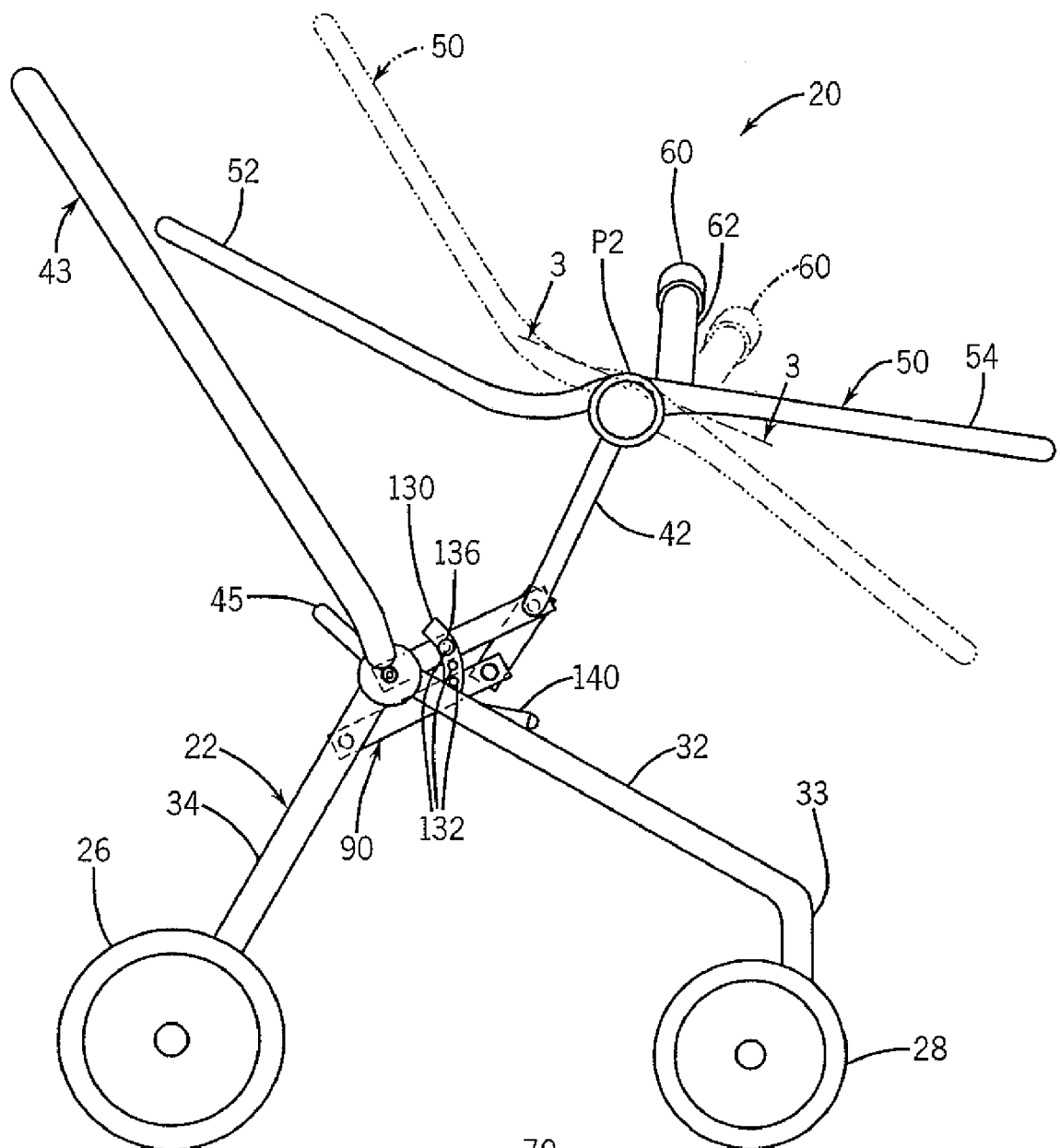
FIG. 2 is a side elevation view of the stroller illustrated in FIG. 1 with the soft goods removed to reveal the stroller frame assembly; (seat rotatable in phantom position)
Figure 3:
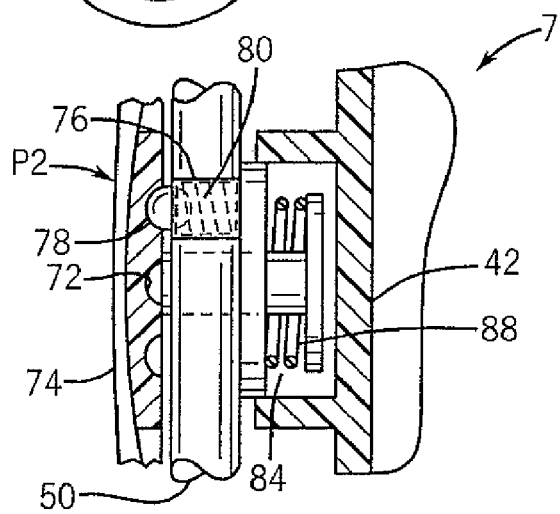
FIG. 3 is a sectional side elevation view taken along line 3-3 of FIG. 2.

Turning now to the drawings, a stroller 20 is depicted in FIGS. 1-3 and is constructed in accordance with the teachings of the present invention. The disclosed stroller components can be fabricated from aluminum, steel, plastic, combinations of materials, or the like and can be tubular or solid, round or non-round in cross-section, and curved or straight as desired. As will be evident to those having ordinary skill in the art, the configuration and construction of the stroller frame assembly can vary considerably and yet fall within the spirit and scope of the present invention. In the disclosed example, the stroller 20 generally has a frame assembly 22 that can advantageously be moved between a folded, or collapsed, storage configuration (FIG. 1 & and an unfolded, or open, in-use configuration (FIG. 1).

The stroller 20 includes a seat assembly 24 supported by the frame assembly 22 having a plurality of stroller frame assembly components, and at least one wheel supporting the frame assembly on a ground surface. As illustrated, the stroller 20 is supported by a pair of laterally spaced rear wheel assemblies 26 (one shown) and a pair of laterally spaced front wheel assemblies 28. In this example, the front wheel assemblies 28 have two wheels 30 spaced apart side by side.

A rear frame leg 34 extends upward and forward from each rear wheel assembly 26. In the illustrated embodiment, the upper end of each rear frame leg 34 is pivotally to a primary frame pivot P1 positioned on each stroller side. A front frame leg 32 extends upward and rearward from each front wheel assembly 28. The front frame legs 32 are integrally connected at their upper, rearward, ends to a laterally extending cross member 45. The front frame legs 32 are connected and fixed at a location forward of the cross member 45 to an upper cross member 46 (see FIG. 4) that extends laterally between, and connected to, the two primary frame pivots P1. The cross member 45 provides a handle for the caregiver to roll the stroller 20 along a ground support surface when the frame assembly 22 is in its folded configuration. The front frame legs 32 can be curved upwards between the front wheel assembly 28 and the cross member 46. The forward end of each front frame leg 32 can be integrally connected to the corresponding front wheel assembly 28 via a vertical connector bar 33.

The frame assembly 22 further includes a stroller handle 43 for pushing and maneuvering the stroller 20. The handle 43 can assume any configuration known to one having ordinary skill in the art. In the illustrated embodiment, the handle 43 includes a laterally extending handlebar 3 8 integrally connected at its outer ends to a pair of handle support arms 36. When the stroller 20 is in the in-use configuration, the support arms 36 extend down and forward from the handlebar 38, and are connected at their distal ends to the frame pivot P1. The handlebar 38 can be curved such that its middle portion is disposed higher and rearward with respect to its laterally outer ends. The handlebar 38 can be equipped with any suitable gripping portion to allow the caregiver to comfortably drive the stroller 20.

The stroller frame assembly 22 can include a basket assembly 35. The basket assembly 35 includes a basket frame in the form of a basket support bar 37 connected laterally between the rear wheel assemblies 26. The support bar 37 is curved such that its lateral outer ends are disposed below its center portion. A basket 39 in the form of a soft goods material is connected to the support bar 37 at its rear end, and to the front frame legs 32 at its forward end. The basket 39 defines a storage compartment 41 for retaining miscellaneous items.

The seat assembly 24 can advantageously be vertically raised or lowered through a plurality of selected height selections. The seat assembly 24 includes a seat support member in the form of a U-shaped seat support bar 42 including a laterally extending crossbar 47 that is integrally connected to a pair of uprights 48 extending perpendicularly out from the laterally outer ends of the cross member 47. The outer, free ends of the uprights 48 are pivotally connected to a pair of seat pivots P2 (one shown) positioned on each stroller side. When the stroller frame assembly 22 is in the in-use configuration, the uprights 48 extend upward and rearward from the cross member 47.

The seat assembly 24 further includes a seat frame 50 that is likewise pivotally connected to the seat pivots P2. The seat frame 50 has an upper U-shaped frame member 52 supporting the head and upper torso region of the child supported in the seat assembly 24. The seat frame 50 further includes a lower U-shaped frame member 54 supporting the lower torso region of the child supported in the seat assembly 24.

An armrest 56 is connected to both sides of the seat frame 50. The armrest 56 includes an upper surface 58 that is sized and shaped to be comfortably engaged by the child seated in the seat assembly 24. Furthermore, the armrest 56 is a solid member extending up from the seat frame 50 to serve as a guide that ensures that the legs of the seated child remain inside the boundaries of the seat assembly 24, particularly when the seat assembly 50 is in a horizontal or carry-cot orientation for use with the seated occupant lying down in the seat. The seat assembly 24 can further include an arm bar 60 extending laterally across the seat frame 50 and having outer ends that are integrally connected to the outer ends of support arms 62. The inner ends of the support arms 62 are connected to the seat pivot P2 to allow the arm bar 60 to be folded and unfolded between a collapsed storage position and an in-use position.

A seat 64 in the form of soft goods material (e.g., a fabric or mesh) is connected to the seat frame 50 and includes a seat back portion, a seat portion, and a lower torso supporting region. Though not illustrated, the seat assembly 24 can further include a tray for the temporary storage of miscellaneous items, such as food for consumption by the seated occupant or toys, a cup holder for the storage of a beverage, and a canopy. The tray, cup holder, and canopy can be constructed in the usual manner.

The upper frame member 52 is connected at its forward distal ends to the seat pivots P2. The lower frame member 54 is connected at its rear distal ends to the seat pivots P2. Accordingly, the seat assembly 24 can pivot about the seat pivots P2 to a desired angular seat orientation. At one extreme angular orientation, the seat 64 assumes a substantially horizontal, or carry-cot, orientation as illustrated in FIGS. I and 2, and in the opposite extreme angular orientation, the seat 64 assumes a substantially vertical, or standard seating, orientation shown in phantom in FIG. 2. The angular orientation of the seat 64 can also be set between the two extreme angular orientations.

Specifically, referring now also to FIG. 3, the stroller frame assembly 22 includes a pair of seat orientation assemblies 70 on each side of the stroller 20 (one shown) connected between the pivot P2 and the seat assembly 24 that permits adjustment of the angular orientation of the seat 64. The orientation assembly 70 includes a plurality of radially spaced detents 72 formed in the laterally inboard surface of a pivot plate 74 forming part of the seat pivot P2. The seat frame 50 defines a radially extending aperture 76 that is in circumferential alignment with the detents 72 formed in the pivot plate 74. As illustrated, the upper frame member 52 is integrally connected to the lower frame member 54. A pawl 78 is disposed within the aperture 76 and has an outer surface sized and shaped to nest within the detents 72. As illustrated, both the detents 72 and the pawl 78 are round. A radially extending compression spring 80 is seated within the aperture 76 and biases the pawl 78 against a selected one of the detents 72. A spring seat 82 is disposed laterally inboard of the seat frame 50 and is supported by a shaft 84 extending from the inboard surface of the pivot plate 74. The shaft 84 supports a washer 86 disposed laterally inboard of the seat frame 50, and a compression spring 88 disposed between the spring seat 82 and the washer 86. The compression spring 88 exerts a force against the washer 86 which is a friction member biased against the seat frame 50, and exerts a frictional force against the seat frame 50.

During operation, the seat frame 50 is moved between a plurality of angular orientations by rotating the seat frame 50 clockwise or counterclockwise about seat pivot P2, which causes the pawl 78 to move to, and nest within, an adjacent radial detent 72, thereby locking the seat in a desired angular orientation. Depending on the direction of seat frame rotation, the seat can be locked in progressively increasingly horizontal or vertical orientations between the horizontal carry-cot orientation and the vertical standard orientation. The frictional force applied by the washer 86 against the seat frame 50 is overcome in order to angularly adjust the seat. Accordingly, applied the frictional force assists in preventing unintended angular rotation of the seat frame 50.

The seat assembly 24 is connected to the front and rear frame legs 32 and 34 via a stroller adjustment assembly in the form of a linkage 90 that facilitates folding and unfolding of the stroller frame assembly 22, and further facilitates raising and lowering of the seat frame 64. Advantageously, the linkage 90 allows the seat 64 to be raised and lowered independent of folding and unfolding of the stroller frame assembly 22. Accordingly, the seat height can be adjusted as the angular orientation of the seat 64 is adjusted such that the seated occupant is within easy reach of the caregiver. The linkage components disclosed herein can be fabricated from a steel, plastic, such as an injection-molded engineered plastic, or other suitable materials alone or in combination. Components of the linkage can optionally employ other types of biasing and/or damping elements, if desired. Other alternate linkage arrangements, other than a four-bar type arrangement can also be employed to achieve the seat height adjust feature, the fold assist feature, or a combination of these features. As described above, one skilled in the art will appreciate that the various stroller components can very in size, shape, and configuration without departing from the spirit and scope of the present invention.

Figure 4:
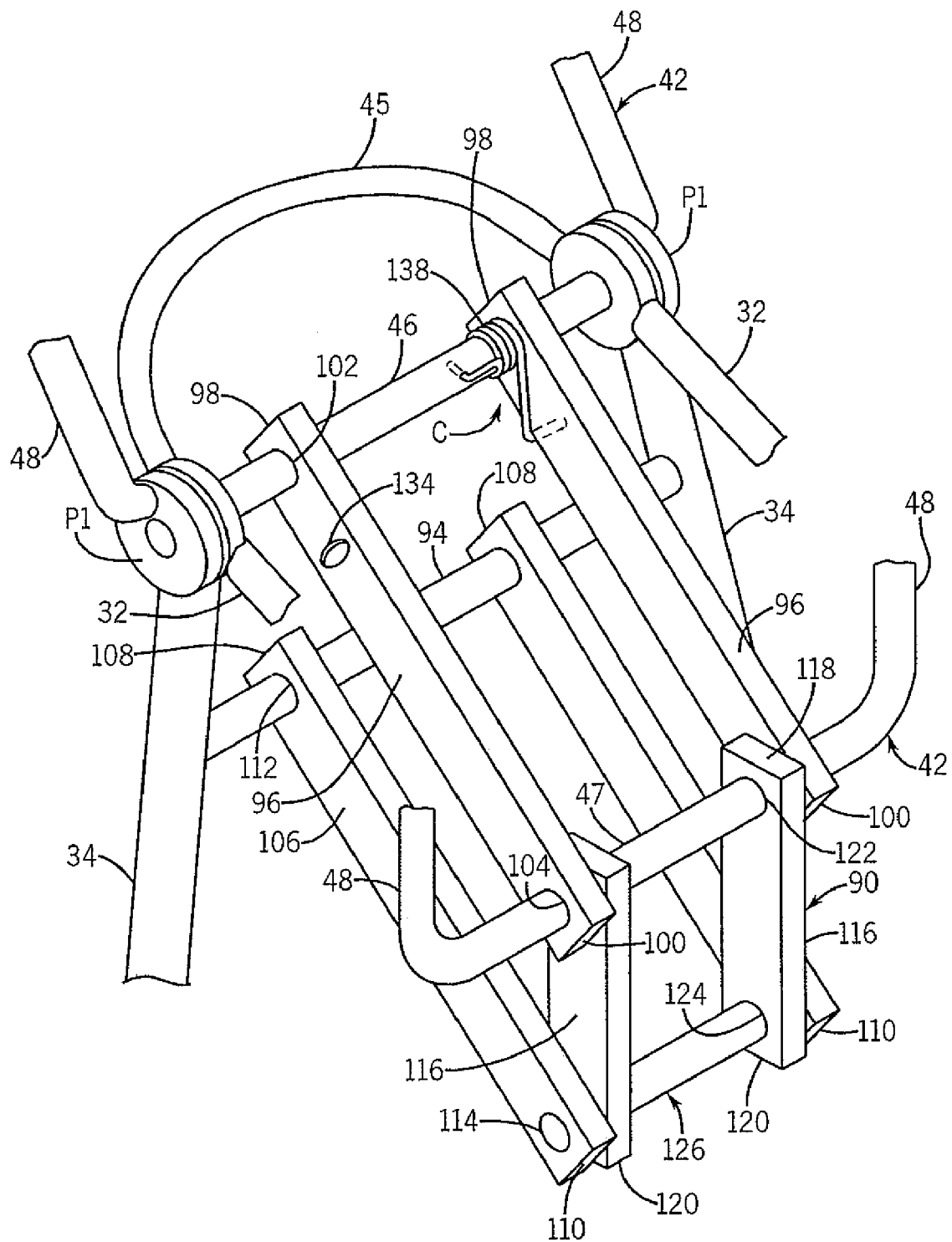
FIG. 4 is a perspective view of the stroller illustrated in FIG. 1 with portions cut away illustrating the adjustment assembly and related stroller components.

Referring now to FIG. 4, the linkage 90 is configured as a four-bar linkage positioned beneath the seat assembly 24. The four-bar linkage 90 is supported by the upper cross member 46 extending laterally between primary frame pivots P1 and a lower cross member 94 extending laterally between rear frame legs 34. The lower cross member 94 is spaced below the upper cross member 46.

The linkage 90 includes a pair of laterally spaced elongated upper links 96. Each upper link 96 defines a rear end 98 and a front end 100, each of which defining a corresponding apertures 102 and 104, respectively, extending laterally therethrough. The linkage 90 further includes a pair of laterally spaced elongated lower links 106 that are disposed below the upper links 96. Each lower link 106 defines a rear end 108 and a front end 110, each of which defining a corresponding apertures 112 and 114, respectively, extending laterally therethrough. The rear ends 98 and 108 of the links 96 and 106 are thus connected to the stroller frame 22. The linkage 90 further includes a pair of laterally spaced elongated forward links 116 extending between the front ends 100 and 110 of the upper and lower links 96 and 106, respectively. Each forward link 116 defines an upper an upper end 18 and a lower end 120, each of which defining a corresponding aperture 122 and 124, respectively, extending laterally therethrough. The links 96, 106, and 116 can assume virtually any desirable shape, and are rectangular in the illustrated embodiment. The front end 100 of the upper links 96 and the upper ends 18 of the forward links 116 are connected to the seat assembly 24.

The upper cross member 46 extends through the rear apertures 102 of the upper links 96 such that the links 96 can rotate about the upper cross member 46. Likewise, the lower cross member 94 extends through the rear apertures 112 of the lower links 106 such that the links 106 can rotate about the lower cross member 94. The front apertures 114 of the lower links 106 and the lower apertures 124 of the forward links 116 receive a front cross member 126 such that the forward links 116 are spaced laterally inboard of the lower links 106. The forward links 116 can thus pivot about the front cross member 126 with respect to the lower links 106. The upper apertures 122 of the forward links 116 and the front apertures 104 of the upper links 96 receive the cross member 47 of the seat support bar 42 such that the forward links 116 do not rotate with respect to the seat support bar 42 when the stroller is in the in-use configuration. The seat support bar 42 thus structurally supports the seat assembly 24 when the pins are in place. The upper links 96 are connected so as to rotate about the cross member 47. The upper links 96 are thus rotatable about the cross member 47 with respect to the forward links 116.

The linkage 90 is thus a four-bar linkage (substantially defining a parallelogram) that is defined by the upper link 96, the lower link 106, the forward link 116, and that portion of the rear frame leg 34 extending between the upper cross member 46 and the lower cross member 94. The linkage 90 supports the seat assembly 24 and facilitates height adjustment of the seat assembly 24, as will now be described.

Figure 5:
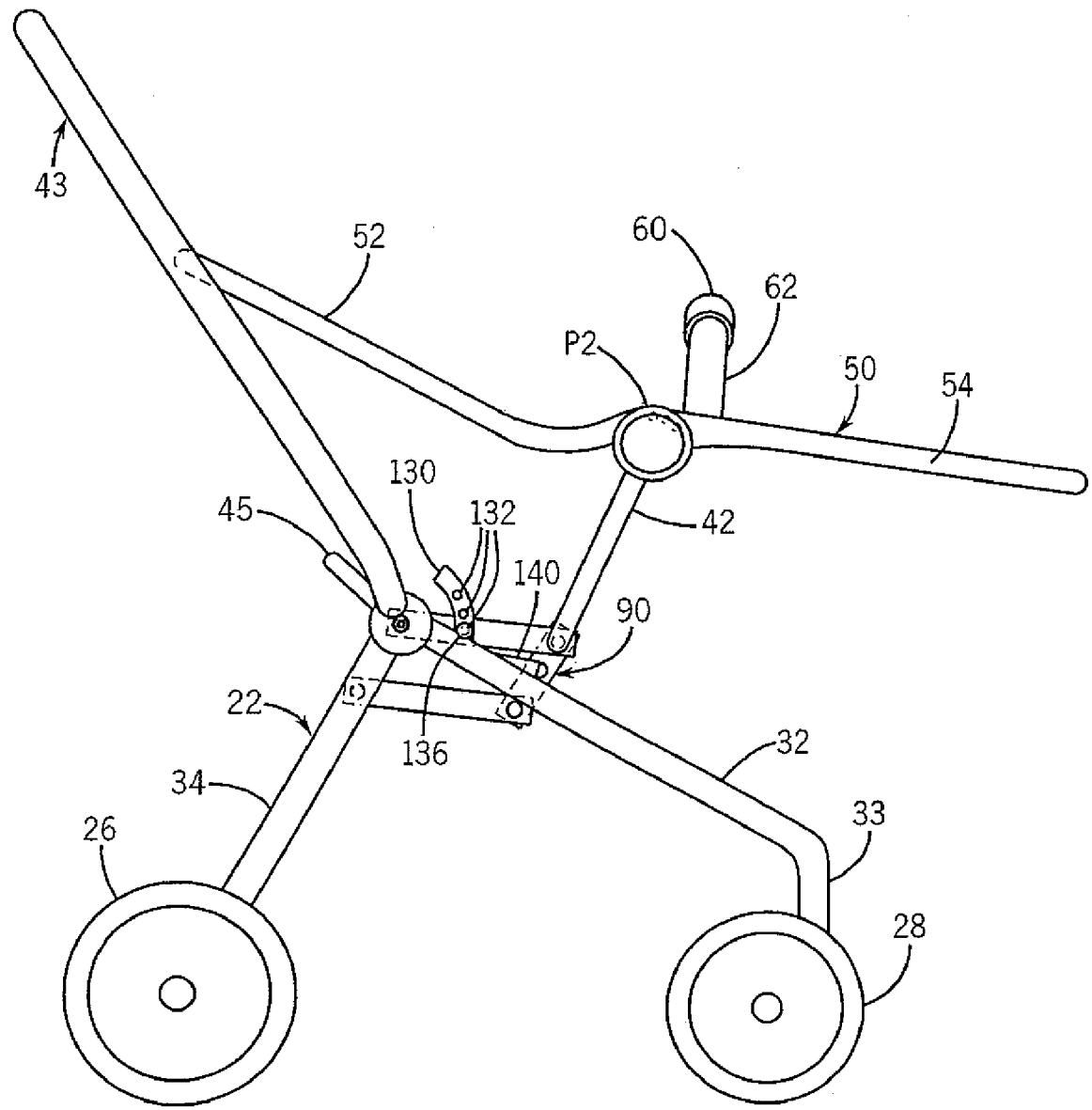
FIG. 5 is side elevation view of the stroller illustrated in FIG. 2 with the seat in a vertically adjusted position.

Specifically, referring to FIGS. 2 and 4 and 5, the seat support bar 42 is raised as the upper and lower links 96 and 106 are rotated counterclockwise about the upper and lower cross members 46 and 94 in the direction of Arrow A. It should be appreciated that as the seat support bar 42 is raised and lowered, the seat assembly 24 is raised and lowered accordingly. Likewise, the seat support bar 42 is lowered as the upper and lower links 96 and 106 are rotated clockwise about the upper and lower cross members 46 and 94 in the direction of Arrow B. The pivotal connections of the upper link 96, lower link 106, and forward link 116 allow the linkage 90 to accommodate the movement of the seat support bar 42.

As illustrated in FIG. 2, the frame assembly 22 can include a latch member 130 having a lower end that is mounted onto one of the front frame legs 32. The latch member 130 is curved upward and rearward from the front frame leg 32 in a direction of the arcuate motion of the corresponding upper link 96 as the link 96 rotates to raise and lower the seat assembly 24. A plurality of spaced locating apertures 132 extends through the latch member 130 and is circumferentially aligned with an aperture 134 extending through the upper link 96 (see FIG. 4). A pin 136 is provided having a shaft sized to extend through one of the apertures 132 of the latch member 130 and further through the aperture 134 extending through the upper link 96. The upper link 96 can be raised and lowered such that the aperture 134 is aligned with a selected one of the apertures 132 corresponding to a desired seat height. The pin 136 can then be inserted through a select one of the apertures 132 and further through aperture 134 to lock the seat assembly 24 in the desired vertical position.

Raising and lowering the upper link 96 causes the lower link 106 to rotate along with the upper link 96 about the upper and lower cross members 46 and 94, respectively. Advantageously, the linkage 90 causes the seat height to raise and lower without causing the stroller frame 22 to move between its folded and unfolded configuration.

The pin 136 can be removed and the seat assembly 24 can be raised or lowered to a second desired height among a plurality of vertical locations or heights defined by the alignment of apertures 132 and 134, at which point the pin 136 is again inserted to lock the seat assembly 24 at the second desired height. Two vertically adjusted seat heights are illustrated in FIGS. 2 and 5.

Referring again to FIG. 4, a torsion spring 138 can be mounted onto one of the cross members 46 and 94, and as illustrated in FIG. 4, is mounted onto the upper cross member 46, and biases one of the upper links 96 in the counterclockwise direction of Arrow C to assist the user when raising the seat assembly 24, and to prevent the seat assembly 24 from collapsing to the lowermost position under gravitational forces when the pin 136 is removed from the aperture 134.

Advantageously, the linkage 90 further assists in folding the stroller frame assembly 22 to a compact flat storage configuration. In particular, the linkage 90 operatively connects two frame member components and drives one frame member to its folded configuration in response to movement of another, linked, frame member to its folded configuration. In the illustrated embodiment, the linkage 90 operatively connects rear legs 34 to the seat support bar 42 as the stroller frame assembly 22 is folded and unfolded.

Figure 6:
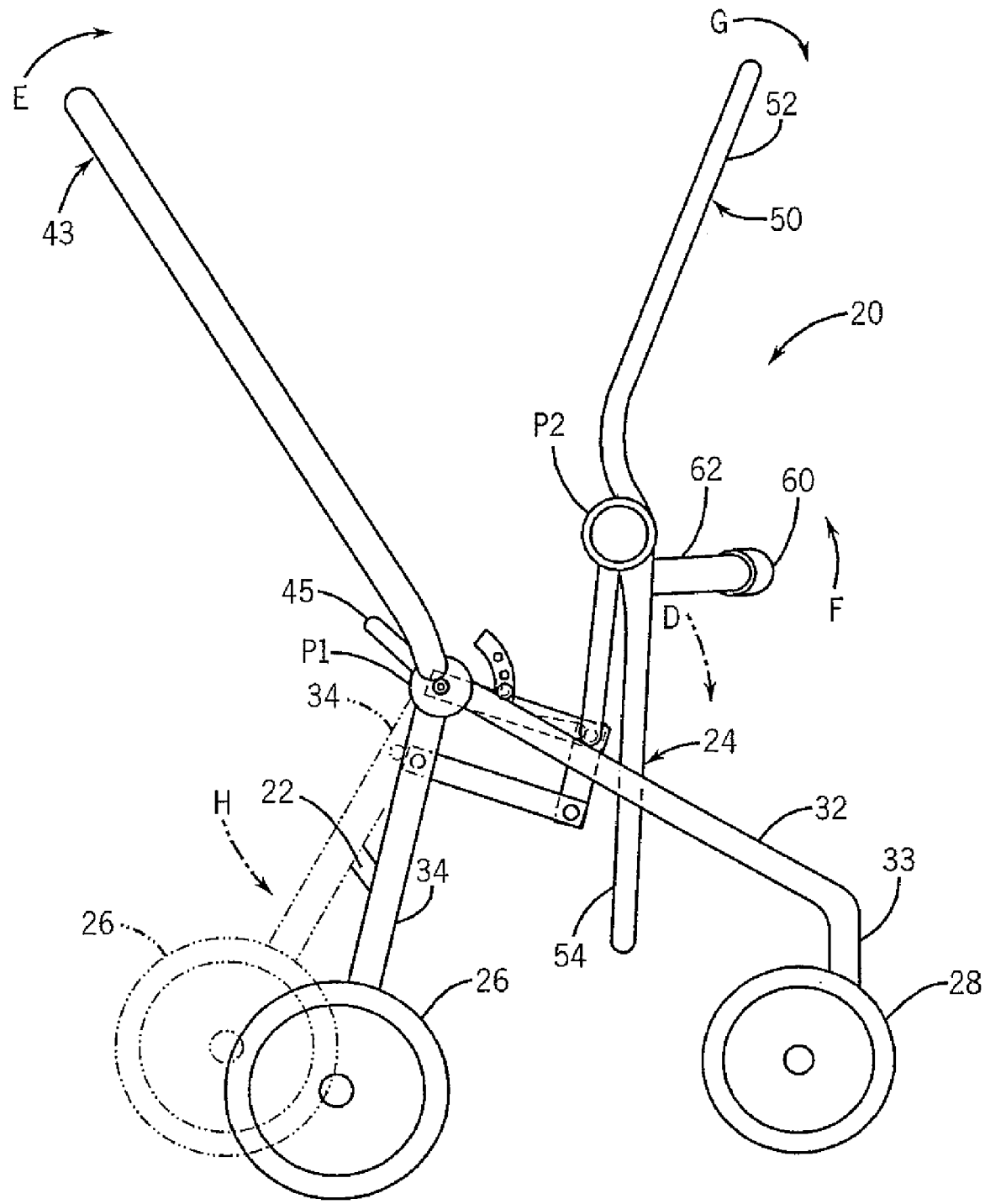
FIG. 6 is a side elevation view of the stroller illustrated in FIG. 2 in a partially folded configuration.
Figure 7:
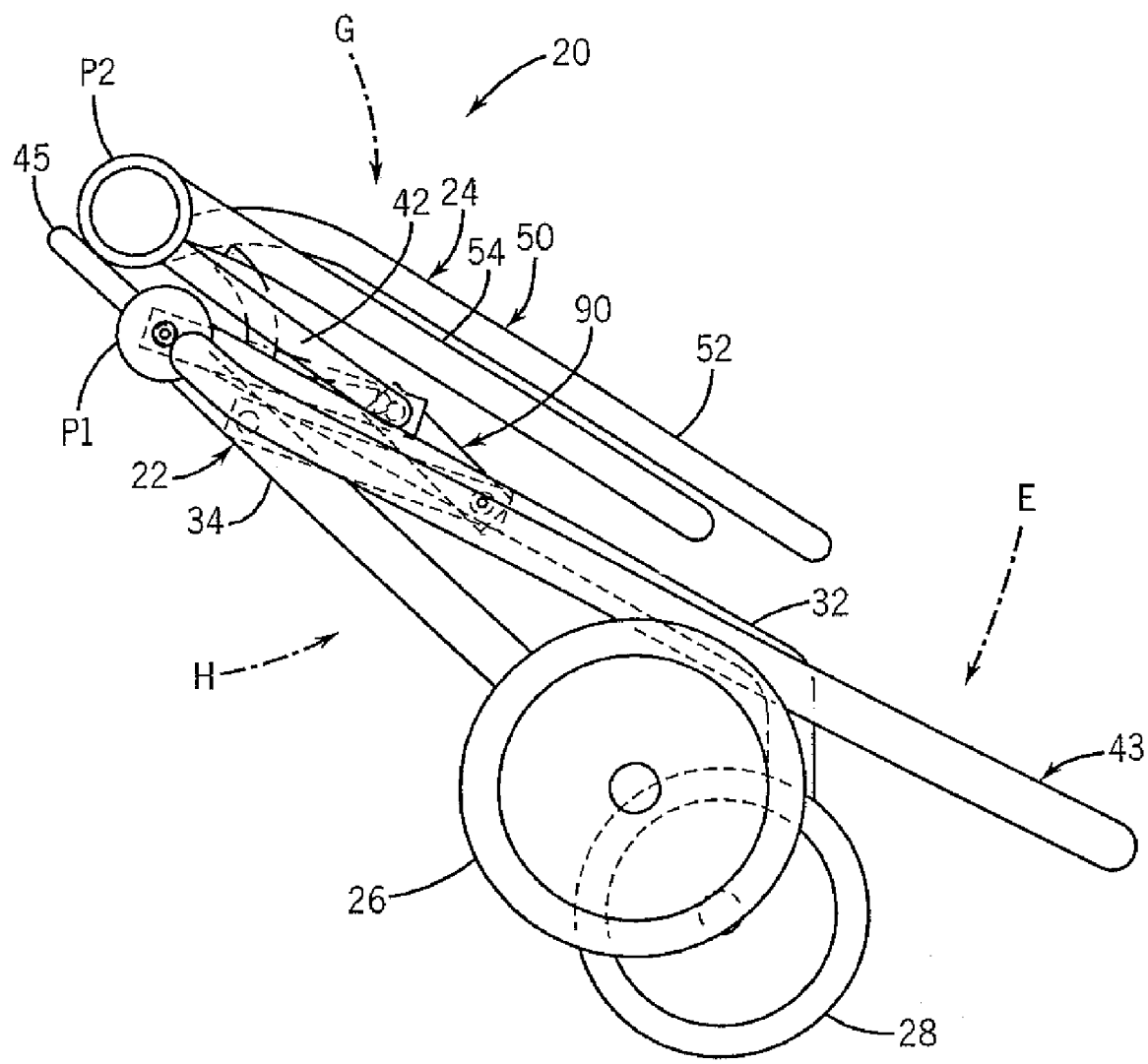
FIG. 7 is a side elevation view of the stroller illustrated in FIG. 6, with the stroller frame in a folded, or collapsed, storage configuration.

Referring now to FIGS. 6-7, the frame assembly 22 can be folded by first lowering the seat assembly 24 from its unfolded position to its folded storage position. Specifically, the pin 136 is removed from at least aperture 134 and the selected aperture 132, if desired, and the seat assembly 34 is rotated clockwise about the direction of Arrow D until the cross member 47 of the seat support bar 42 rests against the upper surface of the front frame legs 32. If desired, one or more latch members 140 (See FIG. 1) can be mounted to the front frame legs 32 to lock the cross member 47 in its lowermost position. The latch member 140 can include an arm that can be extended over the top of the cross member 47, or alternatively can include a plunger at its outer end that becomes depressed as the cross member 47 cams over the latch 140, and springs back out over the cross member 47 to lock the crossbar in its lowermost position.

Next, the handle 43 is moved from its unfolded position to its folded storage position by rotating the handle 43 clockwise in the direction of Arrow E until the handle support arms 36 extend in a direction substantially parallel with the front frame legs 32, at which point the handle is in the folded position. The handle support arms 36 define a lateral distance therebetween that is greater than the lateral distance between the front frame legs 32 such that the front frame legs 32 are disposed between the handle support arms 36 when the handle 43 is folded. The handlebar 38 extends across the upper surfaces of the front frame legs 32 when the handle 43 is folded.

Next, the arm bar 60 is moved from its unfolded position to its folded storage position by rotating the arm bar 60 counterclockwise in the direction of Arrow F (see FIG. 6) until it nests inside the stroller frame 50. Next, if the upper frame member 52 is pivotally connected to the lower frame member 54, then the upper frame member is moved from its unfolded position to its folded position by rotating the upper frame member 52 clockwise about seat pivot P2 in the direction of Arrow G until the upper frame member 52 is folded onto the lower frame member 54.

Finally, the rear frame legs 34 are moved from their unfolded position to their folded storage position by rotating the legs 34 counterclockwise in the direction of Arrow H until the rear frame legs 34 extend substantially parallel with the front frame legs 32. The basket support bar 37 likewise travels along with the rear frame legs 34. Because the lateral distance between the rear wheel assemblies 26 is greater than the distance between the front wheel assemblies, the front wheel assemblies 28 are disposed between the rear wheel assemblies 26 when the rear frame legs 34 are folded. Rotation of the rear frame legs 34 displaces the lower cross member 94 in a direction forward with respect to the upper cross member 46. The forward motion of the lower cross member 94 causes the lower links 106 to correspondingly drive the lower ends 120 of the forward links 116 in a forward direction, thus causing the upper ends 118 of the forward links 116 to drive the uprights 48 of the seat support bar 42 to an orientation substantially parallel with the front frame legs 32.

The stroller frame 22 can be unfolded to its in-use configuration by rotating the rear frame legs 34 clockwise to their in-use configuration, which drives the linkage 90 to urge the seat support bar 46 to its in-use configuration. Advantageously, the linkage 90 drives one frame member component to be unfolded automatically in response to another frame member component being moved to its unfolded configuration. Next, if the upper frame member 52 is pivotally connected to the lower frame member 54, the upper frame member 52 is rotated counterclockwise about pivot P2 with respect to the lower frame member 54 to its in-use configuration. Finally, the stroller handle 43 is rotated counterclockwise to its in-use configuration.

The present invention thus provides a stroller 20 that advantageously incorporate a four-bar linkage 90 that performs two discrete functions: to assist with raising or elevating an infant/child seat or carry-cot; and to assist with folding or collapsing the frame structure of the stroller assembly. The angular orientation of the seat 64 can be adjusted to assume in a carry-cot orientation or a standard seating orientation (and angular positions therebetween), and the height of the seat 64 can be adjusted to allow the occupant to be placed in a raised position to minimize the bending required of the care-giver. The folding feature can be employed with a gas-assist and/or damping cylinder and/or one or more biasing elements such as torsion springs in varying degrees to improve the overall function and ease of movement of the components.

Although certain stroller assemblies and features have been shown and described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller, movable between an unfolded configuration and a folded configuration, the stroller comprising:
    a stroller frame including a plurality of stroller frame components, wherein the stroller frame is movably supported by at least one wheel;
    a seat assembly supported by the stroller frame, the seat assembly including a seat support bar and a seat that can be selectively moved by a user between a first height and a second height different than the first height relative to the stroller frame and retained at the selected height in the unfolded configuration;
    a linkage having a first end connected to the stroller frame and having a second end connected to the seat support bar at only one pivot axis,
    wherein the linkage operatively joins a first stroller frame component and the seat support bar such that movement of the first stroller frame component between a folded and an unfolded position causes the seat support bar to correspondingly move between a folded and unfolded position.

2. The stroller as recited in claim 1, wherein the first stroller frame component is a rear leg supporting a rear wheel assembly, and the seat support bar supports the seat assembly.

3. The stroller as recited in claim 1, wherein the linkage supports the seat such that the height of the seat is adjustable without causing the stroller frame to be moved toward the folded or unfolded configuration.

4. The stroller as recited in claim 1, further comprising a latch configured to lock the seat assembly at the selected height.

5. The stroller as recited in claim 1, wherein the seat assembly comprises a pivot and a seat frame pivotally connected to the pivot such that the angular orientation of the seat frame is adjustable.

6. The stroller as recited in claim 1, wherein the stroller frame comprises an outwardly projecting handle pivotally connected for movement between a folded position and an unfolded position.

7. The stroller as recited in claim 1, wherein the linkage comprises a four-bar linkage.

8. The stroller as recited in claim 1, wherein the linkage comprises an upper link and a lower link, each having a front and rear end, the front ends of the upper and lower links connected to a forward link, and the rear ends of the upper and lower link connected to an upper and lower crossbar, respectively.

9. The stroller as recited in claim 8, wherein the stroller frame comprises a rear leg supported by a rear wheel assembly, wherein the rear leg is connected to the upper and lower crossbars.

10. The stroller as recited in claim 9, wherein the forward link is connected to the seat assembly by the seat support bar.

11. The stroller as recited in claim 10, wherein movement of the rear leg from an unfolded position to a folded position drives the linkage to correspondingly move the seat support bar from the unfolded position to the folded position.

12. The stroller as recited in claim 1, wherein the seat is movable between the selectable first and second seat heights without causing the stroller frame to move between the unfolded configuration and the folded configuration.

13. The stroller as recited in claim 1, wherein the linkage is movable from a first selectable position that defines the first height of the seat to a second selectable position that defines the second height of the seat.

14. The stroller as recited in claim 13, wherein movement of the linkage between the first position and the second position does not cause the stroller frame to move between the unfolded configuration and the folded configuration.

15. The stroller as recited in claim 1, wherein the linkage further comprises a spring member biasing the linkage in a direction that causes the seat height to raise.

16. The stroller as recited in claim 1, wherein the seat moves in a plurality of intervals between the first height and the second height.

17. A stroller comprising:
a stroller frame including at least one front leg supported by a front wheel assembly, a rear leg supported by a rear wheel assembly, the rear leg pivotally connected with respect to the front leg;
a seat assembly supported by the stroller frame, the seat assembly including a seat support bar pivotally connected with respect to the front leg; and
a four-bar linkage connected to the seat support bar and the rear leg, wherein the seat support bar rotates in concert with one of the links of the four-bar linkage relative to another of the links of the four-bar linkage, and wherein movement of the rear leg from an unfolded position to a folded position causes the four-bar linkage to bias the seat support bar from an unfolded position to a folded position, and
wherein the a four-bar linkage is movable from a first position that defines a first user selectable height of the seat assembly to a second position that defines a second user selectable height of the seat assembly different from the first user selectable height.

18. The stroller as recited in claim 17, wherein the seat assembly further comprises a seat frame that is pivotally mounted to the seat assembly so as to be angularly adjustable between a vertical and a horizontal orientation.

19. The stroller as recited in claim 17, wherein the linkage moves in a plurality of selectable intervals between the first selectable position and the second selectable position.

20. A stroller movable between an unfolded configuration and a folded configuration, the stroller comprising:
a stroller frame movably supported by at least one wheel;
a seat assembly supported by the stroller frame and having a seat that can be selectively moved by a user between a first height and a second height different than the first height relative to the stroller frame and retained at the selected height in the unfolded configuration; and
a linkage having a first end connected to the stroller frame and a second end connected to the seat assembly, the linkage operatively joining a rear leg supported by a rear wheel assembly and a seat support bar such that movement of the rear leg between a folded and an unfolded position causes the seat support bar to correspondingly move between a folded and unfolded position,
wherein the linkage comprises an upper link and a lower link, each having a front and rear end, the front ends of the upper and lower links connected to a forward link, and the rear ends of the upper and lower link connected to an upper and lower crossbar, respectively,
wherein the rear leg is connected to the upper and lower crossbars, and the forward link is connected to the seat assembly by the seat support bar, and
wherein the forward link does not rotate with respect to the seat support bar.

21. A stroller, movable between an unfolded configuration and a folded configuration, the stroller comprising:
a stroller frame including a plurality of stroller frame components, wherein the stroller frame is movably supported by at least one wheel;
a seat assembly supported by the stroller frame, the seat assembly including a seat that can be selectively moved by a user, wherein the entire seat is moved between a first height and a second height different than the first height relative to the stroller frame and retained at the selected height in the unfolded configuration;
a linkage having a first end connected to the stroller frame and having a second end connected to the seat assembly,
wherein the linkage operatively joins a first and second stroller frame component such that movement of the first stroller frame component between a folded and an unfolded position causes the second stroller frame component to correspondingly move between a folded and unfolded position.

* * * * *